(12) United States Patent
Logan

(10) Patent No.: US 10,979,969 B2
(45) Date of Patent: Apr. 13, 2021

(54) VOTING TO CONNECT TO A WIRELESS NETWORK

(71) Applicant: Charter Communications Operating, LLC, St. Louis, MO (US)

(72) Inventor: William Kenneth Logan, Overland Park, KS (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 16/870,594

(22) Filed: May 8, 2020

(65) Prior Publication Data

US 2020/0336975 A1   Oct. 22, 2020

Related U.S. Application Data

(60) Division of application No. 16/422,632, filed on May 24, 2019, now Pat. No. 10,652,807, which is a
(Continued)

(51) Int. Cl.

| | |
|---|---|
| *H04W 48/16* | (2009.01) |
| *H04W 72/08* | (2009.01) |
| *H04W 48/20* | (2009.01) |
| *H04W 28/18* | (2009.01) |
| *H04L 25/02* | (2006.01) |
| *H04W 48/06* | (2009.01) |
| *H04W 24/10* | (2009.01) |
| *H04W 24/08* | (2009.01) |
| *H04W 76/10* | (2018.01) |

(52) U.S. Cl.
CPC ......... *H04W 48/16* (2013.01); *H04L 25/0202* (2013.01); *H04W 28/18* (2013.01); *H04W 48/20* (2013.01); *H04W 72/085* (2013.01); *H04W 24/08* (2013.01); *H04W 24/10* (2013.01); *H04W 48/06* (2013.01); *H04W 76/10* (2018.02)

(58) Field of Classification Search
CPC ... H04W 48/16; H04W 48/20; H04W 72/085; H04W 28/18; H04W 76/10; H04W 24/08; H04W 24/10; H04W 48/06; H04L 25/0202
See application file for complete search history.

(56) References Cited

U.S. PATENT DOCUMENTS

| | | |
|---|---|---|
| 6,636,746 B1 | 10/2003 | Hashem et al. |
| 8,073,441 B1 | 12/2011 | Unger et al. |

(Continued)

FOREIGN PATENT DOCUMENTS

WO   WO-2016095974 A1   6/2016

*Primary Examiner* — Afshawn M Towfighi
(74) *Attorney, Agent, or Firm* — Gazdzinski & Associates, PC

(57) ABSTRACT

An example technique is performed by a client on a device, and includes: obtaining attributes relating to the device, to one or more wireless networks, or to both the device and the one or more wireless networks; evaluating the attributes in voting modules of the client to generate votes, with a voting module evaluating one or more of the attributes and generating a vote; making a determination, based on the votes, to connect the device to a wireless network of the one or more wireless networks, or to maintain a connection between the device and the wireless network; and controlling the device based on the determination.

23 Claims, 3 Drawing Sheets

Related U.S. Application Data continuation of application No. 15/669,192, filed on Aug. 4, 2017, now Pat. No. 10,306,548.

(56) References Cited

U.S. PATENT DOCUMENTS

| | | | |
|---|---|---|---|
| 8,090,386 | B2 | 1/2012 | Alizadeh-Shabdiz et al. |
| 9,510,258 | B1 * | 11/2016 | Chaudhuri ............ H04W 36/24 |
| 10,306,548 | B2 | 5/2019 | Logan |
| 10,652,807 | B2 * | 5/2020 | Logan ................... H04W 48/18 |
| 2004/0122952 | A1 | 6/2004 | Kistler et al. |
| 2006/0166677 | A1 | 7/2006 | Derakshan et al. |
| 2006/0193287 | A1 | 8/2006 | Ooshima et al. |
| 2007/0275717 | A1 | 11/2007 | Edge et al. |
| 2008/0287125 | A1 | 11/2008 | Hind et al. |
| 2009/0291686 | A1 | 11/2009 | Alpert et al. |
| 2010/0046466 | A1 | 2/2010 | Morimoto et al. |
| 2010/0149970 | A1 | 6/2010 | Miranda et al. |
| 2010/0159948 | A1 | 6/2010 | Spivey et al. |
| 2011/0029236 | A1 | 2/2011 | Zhou et al. |
| 2011/0165896 | A1 | 7/2011 | Stromberg et al. |
| 2011/0319084 | A1 | 12/2011 | Meshkati et al. |
| 2012/0166618 | A1 | 6/2012 | Dahod et al. |
| 2012/0238287 | A1 | 9/2012 | Scherzer et al. |
| 2013/0044614 | A1 | 2/2013 | Aguirre et al. |
| 2013/0067535 | A1 | 3/2013 | Kang et al. |
| 2013/0262666 | A1 | 10/2013 | Balwani |
| 2013/0331098 | A1 | 12/2013 | Balasubramaniyan et al. |
| 2013/0344857 | A1 | 12/2013 | Berionne et al. |
| 2013/0347073 | A1 | 12/2013 | Bryksa et al. |
| 2014/0071895 | A1 | 3/2014 | Bane et al. |
| 2014/0092731 | A1 | 4/2014 | Gupta et al. |
| 2014/0274044 | A1 | 9/2014 | Lee et al. |
| 2014/0315536 | A1 | 10/2014 | Chow et al. |
| 2015/0003417 | A1 | 1/2015 | Akiyoshi et al. |
| 2015/0181405 | A1 | 6/2015 | Dua et al. |
| 2015/0245280 | A1 | 8/2015 | Zhou et al. |
| 2015/0312833 | A1 | 10/2015 | Gresset et al. |
| 2015/0373633 | A1 | 12/2015 | Chhabra et al. |
| 2016/0150451 | A1 | 5/2016 | Barreto De Miranda Sargento et al. |
| 2016/0227544 | A1 | 8/2016 | Katar et al. |
| 2016/0234674 | A1 | 8/2016 | Maguire |
| 2016/0316410 | A1 | 10/2016 | Tan et al. |
| 2016/0323900 | A1 | 11/2016 | De et al. |
| 2016/0345228 | A1 | 11/2016 | Liu et al. |
| 2016/0381606 | A1 | 12/2016 | Lou et al. |
| 2017/0105216 | A1 | 4/2017 | Jung et al. |
| 2018/0061373 | A1 | 3/2018 | Sato et al. |
| 2018/0184330 | A1 | 6/2018 | Egner et al. |

\* cited by examiner

VOTING TO CONNECT TO A WIRELESS NETWORK

PRIORITY AND RELATED APPLICATIONS

This application is a divisional of and claims priority to co-owned and U.S. patent application Ser. No. 16/422,632 of the same title filed May 24, 2019, and issuing as U.S. Pat. No. 10,652,807 on May 12, 2020, which is a continuation of and claims priority to co-owned U.S. patent application Ser. No. 15/669,192 of the same title filed Aug. 4, 2017, and issued as U.S. Pat. No. 10,306,548 on May 28, 2019, each of the foregoing incorporated herein by reference in its entirety.

Additionally, this application is generally related to the subject matter of co-owned U.S. patent application Ser. No. 15/669,167 filed Aug. 4, 2017 entitled "PRIORITIZING PREFERRED NETWORKS," and issued as U.S. Pat. No. 10,506,616 on Dec. 10, 2019, as well as co-owned and U.S. patent application Ser. No. 15/669,151 filed Aug. 4, 2017 and entitled "CONNECTING TO A WIRELESS NETWORK BASED ON A DEVICE MOBILITY STATE," Ser. No. 16/708,024 filed Dec. 9, 2019 and entitled "CONNECTING TO A WIRELESS NETWORK BASED ON A DEVICE MOBILITY STATE," and Ser. No. 15/669,182 filed Aug. 4, 2017 and entitled "SWITCHING CONNECTIONS OVER FREQUENCY BANDS OF A WIRELESS NETWORK," each of the foregoing incorporated herein by reference in its entirety.

TECHNICAL FIELD

This specification relates generally to system that employs a voting process to determine whether to connect to a wireless network.

BACKGROUND

A mobile device, such as a smartphone, may connect to a wireless network, such as a WiFi network. If there is another wireless network in-range, the mobile device may sever its existing connection to the wireless network, and create a new connection to the other wireless network.

SUMMARY

An example method is performed by a client on a device, and may comprise the following operations: obtaining attributes relating to the device, to one or more wireless networks, or to both the device and the one or more wireless networks; evaluating the attributes in voting modules of the client to generate votes, with a voting module evaluating one or more of the attributes and generating a vote; making a determination, based on the votes, to connect the device to a wireless network of the one or more wireless networks, or to maintain a connection between the device and the wireless network; and controlling the device based on the determination. The example method may include one or more of the following features, either alone or in combination.

The example method may comprise obtaining one or more policies from one or more servers. The one or more policies may comprise data for influencing connection between the device and the one or more wireless networks. The attributes may be evaluated based on the one or more policies. The voting modules may be configured based on the one or more policies. The example method may comprise obtaining one or more policies that are based on operation of the device over a period of time. The one or more policies may comprise data for influencing connection between the device and the one or more wireless networks. The attributes may be evaluated based on the one or more policies.

Each vote may have one of the following values: approve, deny, or abstain, where approve indicates to approve connection to the wireless network, deny indicates to deny connection to the wireless network, and abstain indicates no effect on connection to the wireless network.

Making the determination to connect to the device may be based also on a mobility state of the device. Making the determination to connect to the device may comprise assessing the votes and, based on the assessing, determining whether connection to the wireless network is approved or denied. For connection to the wireless network to be approved, assessing the votes may comprise determining if there is at least one vote to approve the connection to the wireless network and there are no votes to deny connection to the wireless network. For connection to the wireless network to be denied, assessing the votes may comprise determining that there is at least one vote to deny connection to the wireless network.

The one or more attributes may comprise at least one of network signal strength, device network preference, network signal-to-noise (SNR) ratio, or network signal band. Each voting module may be configured to evaluate a single attribute, and/or different voting modules may be configured to evaluate corresponding different attributes.

The example method may comprise weighting at least one of the votes prior to making the determination about whether to connect to the wireless network. The weighting may be performed based on importance of one or more attributes to connecting the device to the wireless network. The importance may be based on information obtained from a server. The importance may be based on a device operating condition. The weighting may be performed by applying a weight to the at least one vote. The example method may comprise adapting the weight based on operation of the device over a time period.

An example method may be performed by a client on a device, and may comprise the following operations: configuring voting modules of the client based on at least one policy containing provisions that are generic for a class of devices and that are unique to the device, with the at least one policy comprising data for influencing connection between the device and one or more wireless networks; evaluating votes from the voting modules to make a determination about whether to connect to, or to maintain connection to, a wireless network among the one or more wireless networks; and controlling the device based on the determination. The example method may include one or more of the following features, either alone or in combination.

The example method may comprise: obtaining attributes relating to the device, to the wireless network, or to both the device and the wireless network; and generating the votes in the voting modules based on the attributes and the at least one policy. The example method may comprise: obtaining at least one attribute not relating to the device or to the wireless network; and generating votes in the voting modules based on the at least one attribute and the at least one policy.

The example method may comprise weighting at least one of the votes prior to making the determination about whether to connect to the wireless network. The weighting may be performed based on importance of one or more attributes to connecting the device to the wireless network. The importance may be based on information obtained from a server. The importance may be based on a device operating condition. The weighting may be performed by applying a weight to the at least one vote. The example method may comprise adapting the weight based on operation of the device over a time period.

In another aspect of the disclosure, a computerized method for making a decision to connect a computerized client device to one or more wireless data networks is described. In one embodiment, the computerized method includes: connecting the computerized client device to a first one of the one or more wireless data networks; obtaining attribute data relating to the one or more wireless data networks; evaluating the attribute data via a plurality of computerized decision modules to generate a plurality of respective data related to the making of the decision; determining, based at least on the plurality of respective data related to the making of the decision, to connect the computerized client device to a second one of the one or more wireless data networks; and controlling the computerized client device based on the determining; wherein at least one of the respective data is related to a prescribed attribute, the prescribed attribute required for enabling the connection to the second wireless data network.

In a second embodiment of the method, the obtaining includes obtaining historical data relating to one or more prior operations of the computerized client device.

In a third embodiment of the method, the obtaining includes obtaining data relating to a level of performance achievable via the one or more wireless data networks.

In a fourth embodiment of the method, the evaluating includes identifying one of the one or more wireless data networks as a network preferred for connecting over at least another of the one or more wireless data networks.

In a fifth embodiment of the method, the evaluating includes evaluating via only a prescribed subset of the plurality of computerized decision modules, the prescribed subset configured to evaluate the required prescribed attribute.

In a sixth embodiment of the method, the determining includes determining that the computerized client device has one or more required security credentials for the second wireless data network.

In a seventh embodiment of the method, the method further includes receiving, at the computerized client device, data representative of one or more policies from a prescribed server entity in data communication with the one or more wireless data networks, the one or more policies related to the enabling of the connection of the computerized client device to the second wireless data network; and the controlling is based at least on a plurality of instructions related to a prescribed network switching operation, the plurality of instructions received as a part of the data representative of the one or more policies.

In an eighth embodiment of the method, the method further includes scanning for at least one additional wireless data network at a prescribed frequency of the scanning, the prescribed frequency adjustable based at least on a mobility state of the computerized client device.

In one variant thereof, the method further includes: receiving additional attribute data related to the at least one additional wireless data network; and based at least in part on the received additional attribute data, determining whether the at least one additional wireless data network is a better candidate for connection than the second wireless data network; wherein the determining of whether the at least one additional wireless data network is the better candidate includes: exchanging test data with the at least one additional wireless data network; and determining that a level of network performance achievable via connection with one of the second wireless data network or the at least one additional wireless data network is higher than another of the second wireless data network or the at least one additional wireless data network, the level of network performance relating to at least one of: throughput, quality-of-service (QoS), available bandwidth, network signal strength, or network signal-to-noise ratio (SNR).

In further aspect of the disclosure, computer readable apparatus is described. In one embodiment, the computer readable apparatus includes a non-transitory storage medium, the non-transitory medium including at least one computer program having a plurality of instructions, the plurality of instructions configured to, when executed on a processing apparatus, cause a computerized mobile device to: connect to a first wireless data network; receive data relating to one or more wireless data networks, the data including one or more baseline values associated with connecting the computerized mobile device to the one or more wireless data networks; receive one or more attribute data related to one or more candidate wireless data networks, the one or more candidate wireless data networks including a subset of the one or more wireless data networks; evaluate at least the data and the one or more attribute data; and based at least on the evaluation, attempt to connect the computerized mobile device to a second wireless data network, the second wireless data network being (i) one of the one or more candidate wireless data networks, and (ii) different than the first wireless data network; wherein the evaluation is performed via at least one or more software modules of the computerized mobile device, each of the one or more software modules configured to evaluate at least one of the one or more attribute data.

In a second embodiment, the data relating to the one or more wireless data networks includes data relating to one or more network conditions under which to sever an existing connection between the computerized mobile device and the first wireless data network.

In a third embodiment, the one or more software modules are obtained from a prescribed server entity and downloaded to the computerized mobile device.

In a fourth embodiment, the one or more software modules are each configured to evaluate a prescribed attribute by utilizing a respective, different evaluation process.

In a fifth embodiment, the plurality of instructions are further configured to, when executed on the processing apparatus, cause the computerized mobile device to: receive additional attribute data related to one or more other wireless data networks, the one or more other wireless data networks (i) including another subset of the one or more wireless data networks, and (ii) different than the candidate wireless networks; and based at least in part on the received additional attribute data, determine whether a level of network performance provided by individual ones of the other wireless data networks is higher than a level of performance of any of the candidate wireless networks.

In a sixth embodiment, the plurality of instructions are further configured to, when executed on the processing apparatus, cause the computerized mobile device to: evaluate one or more then-current capabilities of the computerized mobile device; and based at least on the evaluation of the one or more then-current capabilities of the computerized mobile device, determine whether to attempt the connection to the second wireless data network.

In a further aspect of the disclosure, computerized logic of a computerized mobile device is described. In one embodiment, the computerized logic is configured to make at least one decision to cause the computerized mobile device to switch connection from a first one to a second one of one or more wireless data networks, and the computerized logic includes: logic configured to establish a data connection between the computerized mobile device and the first wireless data network; logic configured to obtain first data relating to at least one of: (i) the computerized mobile device, or (ii) the one or more wireless data networks; logic configured to receive second data relating to a plurality of policies, the plurality of policies related to the switch from a first wireless data network to a second wireless data network; logic configured to evaluate, via a plurality of computerized decision modules, at least the first data and the second data; and logic configured to, based at least on the evaluation, cause the computerized mobile device to switch the connection from the first wireless data network to the second wireless data network.

In a second embodiment, the receipt of the second data includes receipt of a monitoring code configured to (i) run on the computerized mobile device, and (ii) track data relating to connection history of the computerized mobile device.

In one variant thereof, the monitoring code is further configured to identify, based at least on the tracked data, at least one of the one or more wireless data networks as being preferred for connection than other ones of the one or more wireless data networks.

In another variant thereof, the receipt of the second data includes receipt of two or more policies with incompatible provisions; and the computerized logic further includes logic configured to resolve the incompatible provisions according to one or more prescribed rules stored on the computerized mobile device.

In a third embodiment, the causation of the computerized mobile device to switch the connection to the second wireless data network includes maintenance of the connection to the first wireless data network concurrently.

In another aspect of the disclosure, a computerized method for making a decision for a computerized client device to switch connection from a first wireless data network to a second wireless data network is described. In one embodiment, the computerized method includes: receiving data relating to one or more policies related to the making of the decision for the connection switch; monitoring, via a computerized logic configured to run on the computerized client device, interaction between the computerized client device and at least one of (i) the first wireless data network or (ii) the second wireless data network for a prescribed period of time; based at least on the monitoring, obtaining attribute data relating to at least the second wireless data network; utilizing at least one of a plurality of computerized decision modules of the computerized client device to evaluate the obtained attribute data; and based at least on the received data relating to the one or more policies and the evaluation, causing the computerized client device to make the connection switch.

In a second embodiment of the method, the receiving of the data relating to the one or more policies includes receiving the data relating to the one or more policies based on at least one of a prescribed time interval or a prescribed operational trigger.

In a third embodiment of the method, the monitoring of the interaction includes tracking historical data related to data communication between the computerized client device and the at least one of (i) the first wireless data network or (ii) the second wireless data network.

In a fourth embodiment of the method, the utilizing of the at least one computerized decision module to evaluate the obtained attribute data includes utilizing the at least one computerized decision module to evaluate at least one attribute data designated as being required to be evaluated for the causing of the computerized client device to make the connection switch.

Any two or more of the features described in this specification, including in this summary section, may be combined to form implementations not specifically described in this specification.

All or part of the processes, methods, systems, and techniques described herein may be implemented as a computer program product that includes instructions that are stored on one or more non-transitory machine-readable storage media, and that are executable on one or more processing devices. Examples of non-transitory machine-readable storage media include, e.g., read-only memory, an optical disk drive, memory disk drive, random access memory, and the like. All or part of the processes, methods, systems, and techniques described herein may be implemented as an apparatus, method, or system that includes one or more processing devices and memory storing instructions that are executable by the one or more processing devices to perform the stated operations.

The details of one or more implementations are set forth in the accompanying drawings and the description below. Other features and advantages will be apparent from the description and drawings, and from the claims.

DESCRIPTION OF THE DRAWINGS

Like reference numerals in different figures indicate like elements.

DETAILED DESCRIPTION

Figure 1:
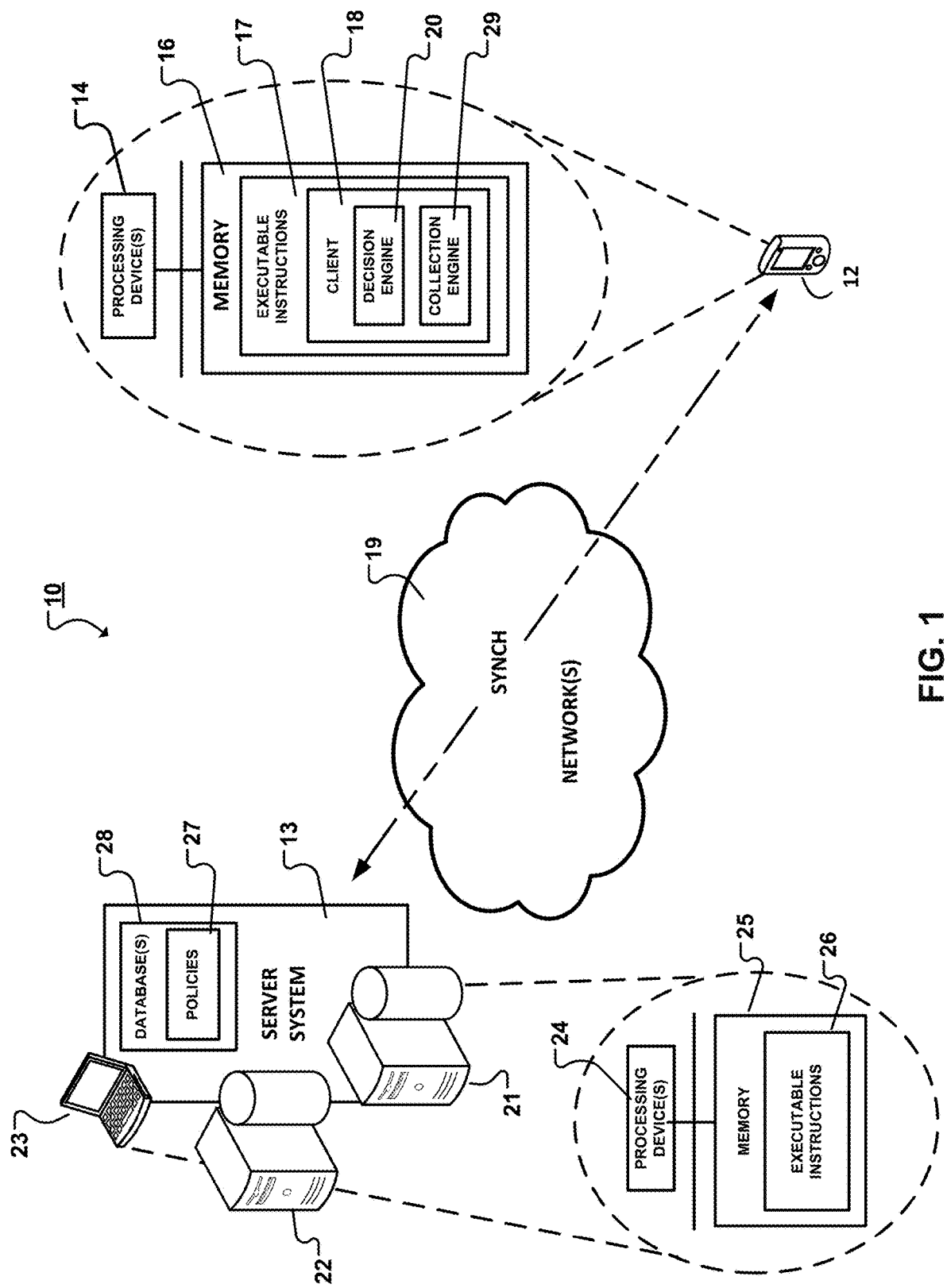
FIG. 1 is a block diagram of an example computer/network architecture on which the example processes described herein may be implemented.

Described herein are example processes, which may be performed by a client on a mobile device ("device"), that employ a voting system to determine whether to connect to a wireless network. The example processes are rooted in computer technology in order to overcome a problem specifically arising in the realm of computer networks. Specifically, movement of a device can result in changes to device performance. For example, as a device moves, the device goes into, and out of, ranges of different wireless networks. As a network's signal wanes due to this movement, the performance of the device over the network may suffer. Factors other than movement may also impact device performance on a network. For example, the number of users on a network can reduce the available bandwidth for the device, which can reduce throughput and increase latency.

To address these problems, the device may switch from an existing connection on one wireless network to a new connection on another, different wireless network. In determining whether to connect to a candidate wireless network, the device may take into account various attributes, such as attributes relating to the device, attributes relating to wireless networks in-range of the device, or attributes relating to both the device and the wireless networks. In some implementations, a candidate wireless network is a wireless network in-range of the device and is being evaluated to determine whether the device should connect to the candidate network. In some implementations, the processes employ voting modules to evaluate the candidate network based on the various attributes. In some implementations, different voting modules may evaluate different attributes. For example, one voting module may evaluate throughput for the candidate network, another module may evaluate latency for the candidate network, and so forth.

In some implementations, each voting module casts a vote indicating whether or not to connect to the candidate network. The votes may be used to determine whether to connect to the candidate network. For example, in some implementations, unanimous "yes" votes are required to connect to the candidate network. In some implementations, a designated critical voting module may prevent connection to the candidate network. By employing voting modules in this manner, in some cases it is possible to connect the mobile device to a network that provides a highest, or desired, level of performance for networks in-range of the device. As a result, degradations in device network performance resulting from device movement or other factors may be remedied, at least in part.

In some examples, the wireless networks include WiFi networks; however, the processes described herein ("the processes") for voting to determine whether to connect to a wireless network may be used with any appropriate type of wireless network, examples of which are provided below. In some implementations, the example processes are performed, at least in part, on a client on a mobile device. Operations performed by the processes may include obtaining attributes relating to a mobile device, to one or more wireless networks, or to both the mobile device and the one or more wireless networks, and evaluating those attributes in voting modules on the client to generate votes. In some implementations, a vote indicates whether a voting module approves connection to a candidate network, denies connection to the candidate network, or abstains, in which case the voting module's vote does not factor into the connection decision. In some implementations, each voting module evaluates one attribute and casts a single vote; however, in some implementations, a single voting module may evaluate one or more attributes and cast one or more votes. The client makes a determination, based on the votes cast, whether to connect the device to a candidate wireless network, or to maintain an existing connection between the device and a wireless network. The client then controls the device based on this determination. In some implementations, the client may control the device either to maintain an existing connection, or to sever the existing connection and to make a new connection to the candidate network. In some implementations, the client may control the device to make a new connection without severing an existing connection. For example, there may be no existing connection to sever, or the device may support connection to multiple wireless networks concurrently. In this regard, following a decision to connect to a wireless network, the client may attempt to make the connection. However, not all attempts will be successful for a variety of reasons. So, even where it is voted to connect to a wireless network, in the end a connection may not be established.

The voting modules may evaluate one or more network attributes and/or device attributes in determining whether to connect to a wireless network. For example, network or device attributes such as throughput, quality-of-service (QoS), available bandwidth, network security, network signal strength, network signal-to-noise (SNR) ratio, device network preference, network signal band, device Internet service provider (ISP), number of users on the network, or some combination of these or other attributes may be taken into account. This list is not exhaustive, and any appropriate attributes may be taken into account in determining whether to connect to a wireless network. Device processing capabilities (e.g., how many clock cycles a CPU can perform per second), device internal memory, remaining device battery life, device battery capacity, and so forth may also be taken into account by the voting modules, as described herein. In some implementations, one or more attributes may be weighted, depending upon their importance to the device's user. For example, if the user has designated network throughput as a critical factor, a vote that is based on throughput may be weighted greater than votes based on other attributes in determining whether connect to a wireless network.

The example processes may be performed, in whole or in part, by a client stored in memory on the mobile device. The client may include one or more software modules comprised of executable instructions to implement the voting processes described herein. In some implementations, the client runs continuously in the background during device operation. The example processes may be implemented, at least in part, also using one or more servers ("servers"). The servers may include one or more software modules comprised of executable instructions to configure the mobile device to implement the voting processes. For example, in some implementations, the servers may store policies that impact which voting modules are used by the client, how the voting modules evaluate network and/or device attributes, weights, if any, to apply to various votes, voting results that enable or prevent a network connection, and so forth. In some implementations, the policies include data for influencing connection between a mobile device and one or more wireless networks. The data may represent, e.g., the voting modules, baseline values for the voting modules, and other components described herein for influencing a connection between the device and a wireless network.

The policies may be loaded onto the servers by an owner of the mobile device or by any other appropriate party having an interest in the operation of the mobile device. For example, an ISP, a mobile network provider, or other party may load the policies on the servers. A Web interface, application programming interface (API), or other appropriate interface may be used to load the policies onto the server. The mobile device may synchronize ("synch") with the server intermittently, periodically, or at any appropriate time to receive, from the server, an operational policy ("policy") that is designated for the mobile device. Synching may be user-initiated or it may be performed automatically based on time or some operational trigger. Either the mobile device or the server may initiate communication. The mobile device and the server may communicate with each other over the Internet or over any other appropriate network or networks. In some implementations, the server may push a policy to the mobile device, or the mobile device may pull a policy from the server. In some examples, the policies on the server may be indexed by telephone number, user name, address, device identifier, or other appropriate indicia. The server may recognize the mobile device based on information such as this, and access appropriate policies for the mobile device.

An example policy for a mobile device may specify, among other things, that each voting module is to evaluate an attribute relative to a predefined baseline. An example of a baseline is a threshold, a combination of thresholds, a range, or any other appropriate information against which to evaluate (e.g., to compare) one or more values, such as attribute values. The policy may provide at least some of the predefined baselines against which each attribute is evaluated. The example policy may also require that each voting module output a single vote based on its evaluation, and that the decision to connect, or not to connect, to a candidate wireless network be based, at least in part, on the votes. In some implementations, the decision to connect, or not to connect, to a candidate wireless network may be based solely on the votes. In some implementations, the decision to connect, or not to connect, to a candidate wireless network may be based on the votes in combination with one or more other factors. An example of these other factors includes, but is not limited to, a mobility state of the device.

In this regard, the mobility state of the device corresponds to an amount of motion experienced by the mobile device. For example, the mobility state may be characterized by a speed or velocity of the device. In some implementations, both a voting result and the mobility state may affect whether a connection may be made to a wireless network. In this regard, In some implementations, the mobility state of a device affects how aggressively the device switches between wireless networks. To this point, the mobility state of a device may affect how often scanning for new networks is performed by the client, which may affect how often the voting modules evaluate attributes. For example, more aggressive switching may require more frequent scanning, whereas less aggressive switching may require less frequent scanning. In some implementations, the level of aggressiveness—as defined by the mobility state of the device—affects the baseline values that the voting modules use to make their evaluations. For example, different baseline values may be used for less aggressive switching than for more aggressive switching.

In some implementations, each vote has one of the following values: approve, deny, or abstain; however, a policy may define votes in any appropriate manner. In this example, a vote to approve indicates to approve connection to the candidate wireless network; a vote to deny indicates to deny connection to the candidate wireless network; and a vote to abstain indicates that that voting module that cast the vote intends to have no effect on connection to the candidate wireless network. The result of the voting is interpreted, and connection is, or is not, attempted and implemented based on the result. In some implementations, to approve a connection to a wireless network, the vote must be unanimous. In some implementations, there must be at least one vote to approve the connection, and no votes to deny the connection. There may, however, be votes to abstain. In some implementations, to deny a connection to a wireless network, only a single deny vote is required. For example, all other votes may be to approve or to abstain; however, if a single deny vote is cast, the connection may be denied. In some implementations, a majority of votes to approve may be required to approve the connection, without regard to the number of deny or abstain votes. In general a policy may set any appropriate criteria for approving or denying a connection.

FIG. 1 shows an example computer/network architecture 10 on which the example processes that employ voting to determine whether to connect to a wireless network may be implemented. The processes, however, are not limited to use with the FIG. 1 architecture, and may be implemented on any appropriate computer architecture and/or network architecture.

In FIG. 1, example computer/network architecture 10 includes a mobile device 12 and a server system 13. The mobile device may be, or include, any appropriate device capable of communicating over a computer network including, but not limited to, a smartphone, a cellular telephone, a digital camera, a tablet computing device, a laptop computer, and so forth. Mobile device 12 may include one or more processing devices 14 (e.g., microprocessors) and memory 16 storing computer/machine-executable instructions 17 that are executable by the one or more processing devices. The instructions may be part of one or more computer programs that implement a client 18 that controls all or part of the voting and connection functionality described herein. In some implementations, the client may include a decision engine 20 that implements the voting processes and system described herein. In some implementations, the client may include a collection engine 29, which obtains network attributes, device attributes, or both network and device attributes, and provides those attributes to the decision engine. In some implementations, the decision engine and the collection engine include functionality other than that described herein. In some implementations, mobile device 12 may be connected to, and accessible over, any appropriate network 19, such as a WiFi network, an LTE (long-term evolution) network, and so forth.

Server system 13 may include one or more computing devices 21, 22, 23 examples of which may include one or more servers, desktop computers, mobile devices, and so forth. An example server system may include one or more processing devices 24 (e.g., microprocessors) and memory 25 storing instructions 26 that are executable by the one or more processing devices. The instructions are part of one or more computer programs that may be used to implement at least part of the processes described herein. For example, the instructions may enable communication between the mobile device and the server system in order to provide the client on the mobile device with policies 27 that control the device's operation, including to implement the voting processes and network connection based on the voting results. These policies may be stored in a database 28 on the server system or at any other appropriate location that is accessible to the server system. Server system 12 may also be connected to, and accessible over, a wired or wireless network 19. In some implementations, the processes may not use the server system, but rather may be implemented solely on the mobile device. For example, policies may be pre-installed on the mobile device, or a user of the mobile device may program the mobile device with one or more appropriate policies.

In some implementations, as described herein, the policies used by the client may be learned policies. More specifically, the server system may provide a policy or policies containing provisions that are generic and applicable to a class or classes of device, such as a particular type of smartphone. However, in some implementations, learned policies include provisions that are device-specific, e.g., they are unique to the mobile device instance, and are determined based on operation of the mobile device over time. Computer-executable code to implement learning processes on the mobile device may be pre-stored in the mobile device or obtained from the server system. In an example, based on connection history and other information available on the mobile device, the client may learn the identity of the mobile device's preferred networks, such as a home network or a work network. This information may be incorporated into a voting module, which may evaluate whether a candidate network is a preferred network for the device. If the candidate network is a preferred network, the voting module may vote to approve connection, for example. If the candidate network is not a preferred network, the voting module may vote to deny connection, for example. In some implementations, a policy provided by the server for a class of devices may be customized for a particular device based on information learned by that device during its operation.

Mobile device 12 and server system 13 may communicate with each other, and with other systems, such as those described herein, over one or more computer networks 19, which may include wireless and/or wired networks.

Figure 2:
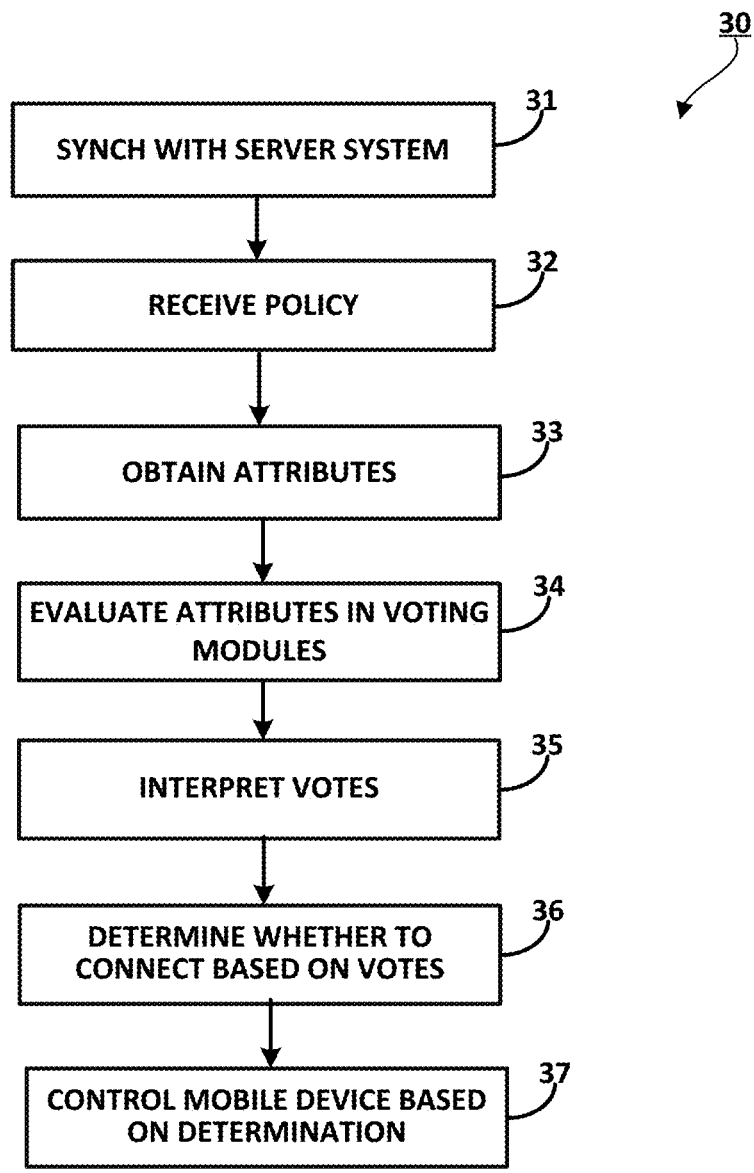
FIG. 2 is a flowchart showing an example process for using voting to determine whether to connect to wireless network.

FIG. 2 shows an example process 30 for implementing a voting system to determine whether to connect to a candidate network. Process 30 may be performed by client 18 in whole, or in part, on the architecture of FIG. 1. According to process 30, client 18 in mobile device 12 synchs (31) with server system 13 over one or more computer networks 19. As explained, during this synchronization, a policy may be pushed by the server system to the client, or the client may request and receive the policy from the server system. The policy specifies, among other things, the criteria that may be used for voting. As explained, a policy may specify which voting modules are to be used for making connection decisions, the baseline values that those voting modules are to use for making evaluations, the requirements for approving or denying connection based on voting, and so forth. In some implementations, the voting modules are software plug-in modules that are received from the server system as part of a policy, and that are incorporated into the client during synchronization with the server system. In some implementations, all or some of the voting modules may be hard-coded onto the mobile device, and the policy specifies which of these to use, and the baseline values therefor. In some implementations, the mobile device may obtain more than one policy from the server system during synchronization. As appropriate, multiple policies may be programmed into the client and used as described herein.

In some implementations, the client may configure the voting modules based on received policies so that the voting modules make evaluations about whether to connect to a candidate wireless network based, e.g., on device attributes, network attributes, or both device attribute(s), network attribute(s). Examples of attributes that may be used for evaluation by the voting modules include, but are not limited to, network throughput, network QoS, available network bandwidth, network latency, network security, network signal strength, network SNR ratio, device network preference, network signal band, device ISP, number of users on the network, device processing capabilities, device internal memory, remaining device battery life, device battery capacity, and so forth. Other attributes not specified herein may be used instead of, or in addition to, those specified. In addition, attributes other than device and candidate network attributes may be factored into voting decisions. For example, if the device is moving into an area having large amounts of radio frequency (RF) background signals or other radiation, this may affect votes. For example, voting modules may be configured to evaluate whether a network in a high-RF area is appropriate for connection, and vote based on the amount of RF noise in the area.

In some implementations, each voting module evaluates a different attribute. For example, there may be a voting module to make an evaluation primarily based on network signal strength, a separate voting module to make an evaluation primarily based on throughput, a separate voting module to make an evaluation primarily based on whether a network is a preferred network for the device, and so forth. In some implementations, each voting module implements an evaluation process that is appropriate to evaluate its corresponding attribute. Accordingly, each voting module may implement a different process. The process implemented by each voting module may, however, take various attributes into account. For example, a voting module that makes its decision on device battery life may also take into account the strength of the network signal, since weak signals may consume more device resources, and thus battery life, than stronger signals.

In some implementations, a voting module may evaluate multiple attributes and output one or more votes based on that evaluation. For example, a single voting module may be configured to make evaluations based on both network signal strength and latency, and then output two votes—one vote relating to network signal strength and one vote relating to network latency. In some implementations, voting modules may evaluate the same attributes using different evaluation processes. For example, two or more different processes evaluating the same attribute may provide a more accurate assessment of that attribute than a single process. For example, one process may measure network QoS in terms of packet loss; another process may measure network QoS in terms of delay, another process may measure network QoS in terms of jitter, and another process may measure network QoS in terms of a combination of two or more of these attributes. In some implementations, different voting modules may make these determinations and each output a single vote, resulting effectively in four QoS votes. In some implementations, a single voting module may implement all of these processes and output four votes—one for each process. A policy may specify any appropriate method for determining an attribute, such as QoS, and program that method in the decision engine.

As noted, in some implementations, the voting modules may be hard-coded to perform evaluations based on attributes and baseline values that may, or may not, be adjustable. In some implementations, the voting modules may be adaptive. For example, an adaptive voting module may collect information about the mobile device that is based use of the device, and configure itself to make a determination based on that information. In the example provided previously, an adaptive voting module may learn that a particular network is a preferred network, and incorporate that information into its voting process. For example, the adaptive voting module may identify a network as a mobile device's home network based on, e.g., routine and prolonged connection to the network. The adaptive voting module may then use a network address such as a subnet address, an ISP associated with the network, and/or other information about the network as a basis for evaluation of candidate networks. For example, if a candidate network has a same network address as the device's home network, it may be recognized as the device's home network.

In some implementations, a policy may require all voting modules to be used each time there is a decision about whether to connect to a network. In some implementations, a policy may allow a subset of all voting modules to be used when there is a decision about whether to connect to a network. For example, the collection engine may provide attributes to the voting modules, and only those voting modules for which attributes are provided may be required, or able, to cast votes. In some implementations, a policy may specify that there must be a defined quorum of voting modules able to cast votes before a vote can be taken about whether to connect to a network. The defined quorum may include some defined minimum number of voting modules. In some implementations, the policy may require that all or some voting modules designated as critical may be required before a quorum is achieved. In some implementations, a user of the mobile device or third party in control of the policy may designate one or more of the attributes as critical to a connection decision. In this example, the corresponding voting module may also be designated as critical to achieving a quorum. For instance, network signal strength may be deemed a critical attribute to evaluate when making a decision to connect to a network. If information about signal strength of a candidate network is not available for voting, and thus the corresponding voting module cannot cast a vote relating to network signal strength, then the client may consider a quorum not to have been achieved, in which case a vote on the candidate network is not taken and no connection to the candidate network is attempted.

In some implementations, a policy may allow votes to be weighted based on one or more appropriate factors. For example, if an attribute is deemed to be critical, a vote relating to that attribute may be weighted more heavily than a vote relating to an attribute that is not deemed to be critical. Weighting may be implemented in any way that is appropriate for a given voting method. For example, a vote may be weighted more heavily than other votes if that vote is required to approve a network connection. In some implementations, votes may have numerical values, and weights may be used to increase the numerical values of votes relating to critical attributes. For example, a weight may increase the numerical value of a vote to reflect that the related attribute is critical. In some implementations, weighting may include increasing the number of votes relating to an attribute deemed to be critical. For example in a system that require a simple majority of "approve" votes to make a connection, additional "approve" votes may be cast to reflect a greater weight applied to a corresponding (e.g., critical) attribute. In general, any appropriate weighting scheme may be used. In some implementations, weights may be adaptive, and change over time. For example, the more that a user interacts with a preferred network, the greater the weight that may be placed on votes relating to that preferred network.

In some implementations, each policy may specify weight values, the method that the votes are weighted, and the circumstances under which weights are applied to votes. In some implementations, the client may determine weight values based, e.g., on an importance of a corresponding attribute to the connection. For example, a greater numerical weight may indicate that a particular attribute is more important to a connection than a lesser weight. A policy may direct a client to determine importance based on device operating conditions. For example, if the client identifies a network having an extremely high throughput and a relatively average latency, the client may adaptively weight votes from the voting module for throughput relatively high in order to take advantage of the network throughput, and use the regular, policy-provided weight for latency or other attributes that the client identifies. The weights may be adapted over time as operating conditions change. For example, if the throughput of the network retreats to relatively normal levels, the weight applied to the throughput vote may be correspondingly decreased.

In this regard, as noted, an example policy requires each vote to have one of the following values: approve, deny, or abstain; however, a policy may define votes in any appropriate manner and is not limited to the designations. In this example, a vote of approve indicates to approve connection to the candidate wireless network; a vote of deny indicates to deny connection to the candidate wireless network; and a vote of abstain indicates that the voting module that cast the vote intends to have no effect on connection to the candidate wireless network. The result of the voting is interpreted, and connection is, or is not, attempted based on the result. In some implementations, to approve a connection to a wireless network, the vote must be unanimous. In some implementations, there must be at least one vote to approve the connection, and no votes to deny the connection. There may, however, be votes to abstain. In some implementations, to deny a connection to a wireless network, only a single deny vote is required. For example, all other votes may be to approve the connection or to abstain; however, if a single deny vote is cast, the connection may be denied, in which case the connection is not attempted. In some implementations, if all voting modules abstain, no connection is attempted.

As noted, other voting mechanisms may be defined by policies. For example, as noted previously, votes may have numerical values. The numerical values may be based, e.g., on a defined importance of a corresponding attribute to the connection. For example, a greater numerical value may indicate that a particular attribute is more important to a connection. For example, if low latency is defined to be more important than network security, an approve vote reflecting low latency (e.g., a latency that is below a defined baseline) may have a value of ten, whereas an approve vote indicating that a network is secure (e.g., a security level that is above a defined baseline) may have a value of one. In some implementations, deny votes may have negative values that reflect how important a missing or non-complying attribute is to a connection. For example, if available network bandwidth is an important attribute, and the available network bandwidth for a candidate network is well outside the realm of acceptability, a relatively high negative number (e.g., −10) may represent a strong deny vote. Similarly, if packet loss is a less important attribute, and the measured packet loss for a candidate network is unacceptable, a relatively low negative number (e.g., −1) may represent a weak deny vote. In some implementations, votes such as these may be summed or otherwise processes and compared to a predefined threshold to determine if connection will be attempted. As noted above, weights may be applied to these numerical values. In some implementations, the numerical values may be adapted over time based on usage of the device, capabilities of the device, information obtained by connection to various networks, and so forth. In some implementations, machine learning techniques may be performed to adapt the numerical values over time.

A policy may also define how votes from the voting modules are to be interpreted, e.g., assessed or evaluated. For example, as described, the votes may be counted, analyzed for content, summed, or otherwise processed in any appropriate manner to determine whether a connection is approved or denied. In this regard, after a connection to a candidate network is approved, a policy may include executable instructions for controlling the device to attempt, and to make, the connection. Whether the connection is actually made may depend upon various factors, such as whether the device has appropriate security credentials for the candidate network, whether a handshake between the device and the network server is successful, and so forth. In some implementations, the connection being attempted may be a new network connection. For example, the device may not currently be connected to a network, or the device may be attempting a second network connection. In some implementations, the connection being attempted may be part of a network switching operation, in which an existing connection to a network is severed, and a substitute connection to the candidate network is attempted. The policy may contain instructions for determining conditions according to which it is permitted to sever an existing connection and to reestablish the prior network connection if the connection to the candidate network is unsuccessful.

The foregoing policies are examples only. Any appropriate policy may be implemented using the server system and mobile devices described herein.

Figure 3:
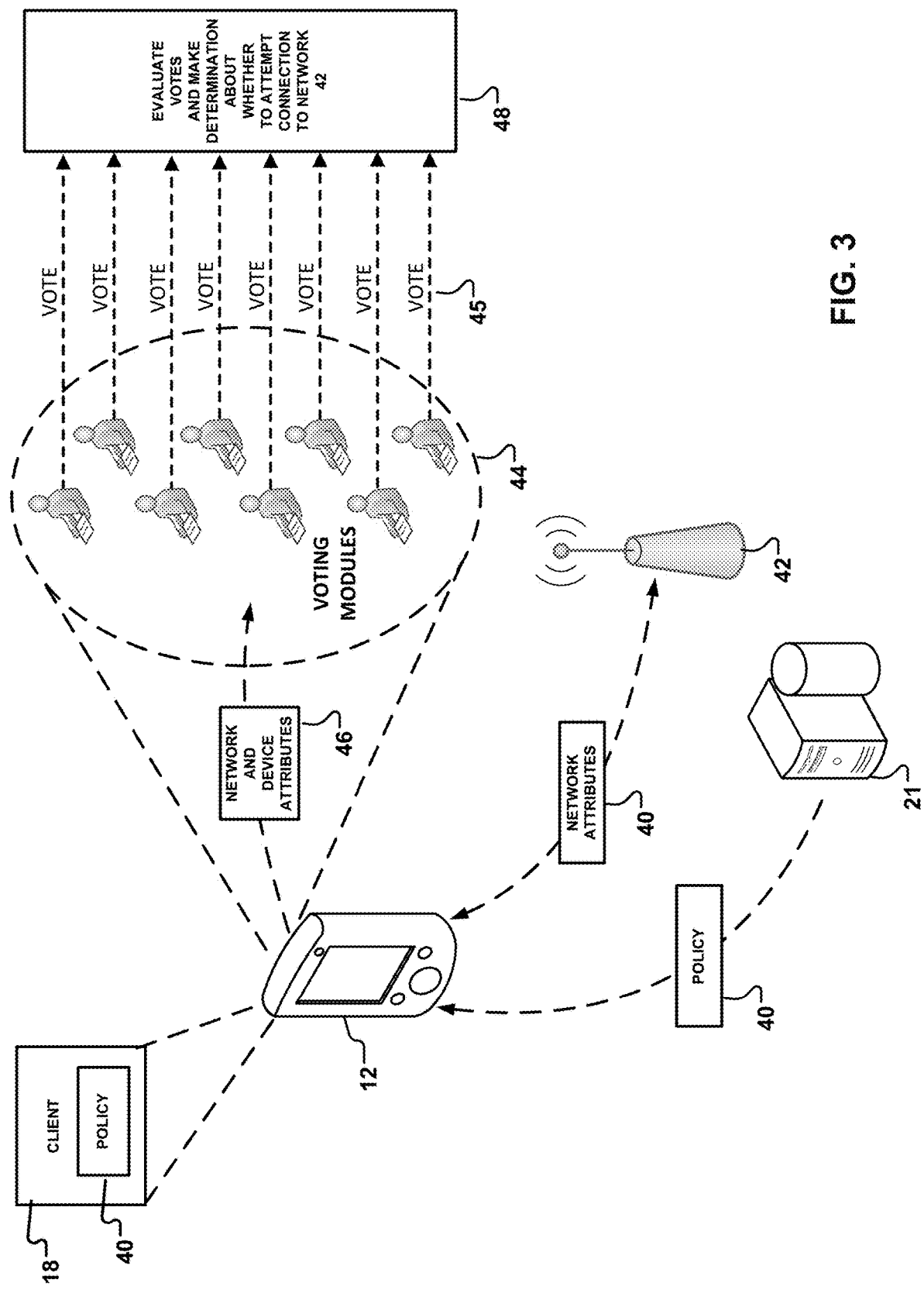
FIG. 3 is a block diagram showing the example process of FIG. 2 conceptually.

Referring back to FIG. 2, client 12 receives (32) one or more policies as a result of synchronization with the server system. Referring to FIG. 3, this is represented conceptually as a server 21 sending a policy 40 to device 12. The received policy or policies may be programmed into the client 18 to cause the device to operate in accordance with the policy. Programming a policy into the device may include incorporating voting modules and their baseline values into the decision engine, incorporating baseline values into existing voting modules in the decision engine, or a combination of both. In some implementations, programming a policy into the device may include adding monitoring code into the device to monitor device usage for the purpose of creating device-specific voting modules as described herein. In some implementations, more than one policy may be programmed into the client. If two or more policies have incompatible provisions, the client may resolve any incompatibilities in accordance with one or more stored rules.

Client 12 obtains (33) attributes relating to the device, to a candidate wireless network or networks, or to both the device and the candidate network(s). In some implementations, as noted, a collection engine 29 obtains the attributes. For example, the attributes relating to the device may be obtained from the device itself or from a device profile obtained from the server system at the time a policy is obtained. In some implementations, the attributes relating to the candidate network(s) may be obtained from the networks through measurement (e.g., by sending and receiving test packets), or from network profiles obtained from the server system at the time a policy is obtained. In some implementations, the attributes relating to the device, to the wireless networks, or to both the device and the wireless networks may be obtained by monitoring the device over time. In the example of FIG. 3, network attributes 41 are represented as being a result of interaction between the client 18 and the network 42.

In some implementations, the attributes relate to one or more wireless networks other than the candidate wireless network that is/are also in-range of the mobile device. Attributes relating to these other wireless networks may be used to evaluate whether they are better candidates for the mobile device than the candidate wireless network. Attributes relating to these other wireless networks may be taken into account to the extent that those other wireless networks affect connection between the mobile device and the candidate wireless network, or transfer of data between the mobile device and the candidate wireless network.

The voting modules in the client evaluate (34) the attributes to generate votes. This is represented in FIG. 3 by voting modules 44 within the client casting votes 45 based on received attributes 46. The voting modules are represented conceptually as voters, but are actually software modules. As explained, a voting module may evaluate one or more of the attributes and generate a vote, or votes, based on the evaluation. In the example of FIG. 3, each voting module casts one vote representing an evaluation of a single attribute; however, as explained herein that may not be the way the system is configured in other implementations. In any case, the voting modules 44 cast votes 45, and the votes are interpreted (35), e.g., evaluated or assessed, as described herein to make a determination (36) (see also block 48 in FIG. 3) on whether to connect the mobile device to the candidate network(s) or, if applicable, to maintain an existing connection between the device and a wireless network. In this regard, in some implementations, process 30 may be used to re-evaluate an existing connection and to determine whether to maintain the existing connection or to attempt to connection to a different wireless network.

The client controls (37) the mobile device based on the determination (36). Controlling the device to attempt, or to implement, a connection to a wireless network may include, as described herein, causing the device to maintain an existing network connection based on constraints defined in one or more policies. Controlling the device to attempt, or to implement, a connection to a wireless network may include, as described herein, causing the device to sever an existing connection to a first wireless network and to create a new connection to a second wireless network based on constraints defined in one or more policies.

The processes have been described in the context of WiFi networks; however, the processes may be used with any appropriate wireless network or networks. Examples of such other networks include, but are not limited to, cellular networks, such LTE networks, 3G networks, and 4G networks, Internet-of-Things (IoT) networks, local area networks (LANs), wide area networks (WANs), or any appropriate combination of wireless networks. In this regard, the processes may be applied to switch connections between the same type, or between different types, of wireless networks.

The processes may be used with both managed and unmanaged wireless networks. In some examples, to operate on a managed network, the client obtains device security credentials along with a policy. Examples include, but are not limited to, a username and password. This information is provided to the wireless network during connection operations. In some examples, to operate on an unmanaged network, the device itself knows the security credentials, e.g., the security credentials are not provided by the sever system along with the policies. This information is provided to the wireless network during connection operations.

Computing systems that may be used to implement all or part of the server system described herein may include various forms of digital computers. Examples of digital computers include, but are not limited to, laptops, desktops, workstations, personal digital assistants, servers, blade servers, mainframes, and other appropriate computers. Computing systems may be part of, included in, or used to implement all or part of the mobile devices described herein. Examples of mobile devices include, but are not limited to, tablet computing devices, personal digital assistants, cellular telephones, smartphones, digital cameras, digital glasses and other portable computing devices. The computing devices described herein, their connections and relationships, and their functions, are meant to be examples only, and are not meant to limit implementations of the technology.

All or part of the processes described herein and their various modifications (hereinafter referred to as "the processes") can be implemented, at least in part, via a computer program product, e.g., a computer program tangibly embodied in one or more information carriers, e.g., in one or more tangible machine-readable storage media, for execution by, or to control the operation of, data processing apparatus, e.g., a programmable processor, a computer, or multiple computers A computer program can be written in any form of programming language, including compiled or interpreted languages, and it can be deployed in any form, including as a stand-alone program or as a module, part, subroutine, or other unit suitable for use in a computing environment. A computer program can be deployed to be executed on one computer or on multiple computers at one site or distributed across multiple sites and interconnected by a network.

Actions associated with implementing the processes can be performed by one or more programmable processors executing one or more computer programs to perform the functions of the calibration process. All or part of the processes can be implemented as, special purpose logic circuitry, e.g., an FPGA (field programmable gate array) and/or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only storage area or a random access storage area or both. Elements of a computer (including a server) include one or more processors for executing instructions and one or more storage area devices for storing instructions and data. Generally, a computer will also include, or be operatively coupled to receive data from, or transfer data to, or both, one or more machine-readable storage media, such as mass storage devices for storing data, e.g., magnetic, magneto-optical disks, or optical disks. Non-transitory machine-readable storage media suitable for embodying computer program instructions and data include all forms of non-volatile storage area, including by way of example, semiconductor storage area devices, e.g., EPROM, EEPROM, and flash storage area devices; magnetic disks, e.g., internal hard disks or removable disks; magneto-optical disks; and CD-ROM and DVD-ROM disks.

Each computing device, such as a smartphone or server, may include a hard drive for storing data and computer programs, and a processing device (e.g., a microprocessor) and memory (e.g., RAM) for executing computer programs.

A computing device may include a graphics system, including a display screen. A display screen, such as an LCD or a CRT (Cathode Ray Tube) displays, to a user, images that are generated by the graphics system of the computing device. As is well known, display on a computer display (e.g., a monitor) physically transforms the computer display. For example, if the computer display is LCD-based, the orientation of liquid crystals can be changed by the application of biasing voltages in a physical transformation that is visually apparent to the user. As another example, if the computer display is a CRT, the state of a fluorescent screen can be changed by the impact of electrons in a physical transformation that is also visually apparent. Each display screen may be touch-sensitive, allowing a user to enter information onto the display screen via a virtual keyboard. On some computing devices, such as a desktop or smartphone, a physical QWERTY keyboard and scroll wheel may be provided for entering information onto the display screen. A computing device, and computer programs executed thereon, may also be configured to accept voice commands, and to perform functions in response to such commands. For example, the example processes described herein may be initiated at a client, to the extent possible, via voice commands.

Elements of different implementations described herein may be combined to form other implementations not specifically set forth above. Elements may be left out of the processes, computer programs, interfaces, etc. described herein without adversely affecting their operation or the operation of the system in general. Furthermore, various separate elements may be combined into one or more individual elements to perform the functions described herein.

Other implementations not specifically described herein are also within the scope of the following claims.

What is claimed is:

1. A computerized method for making a decision to connect a computerized client device to one or more wireless data networks, the computerized method comprising:
    causing the computerized client device to connect to a first one of the one or more wireless data networks;
    causing, based at least on one or more of a prescribed frequency or prescribed condition, the computerized client device to scan for at least one additional wireless data network of the one or more wireless data networks, the prescribed frequency based at least on a mobility state of the computerized client device;
    based at least on the scan, evaluating attribute data via a plurality of computerized decision modules to generate a plurality of respective data related to the making of the decision;
    causing, based at least on the plurality of respective data related to the making of the decision, the computerized client device to connect to a second one of the one or more wireless data networks.

2. The computerized method of claim 1, further comprising obtaining attribute data relating to the one or more wireless data networks, the obtaining comprising obtaining data relating to one or more prior operations of the computerized client device.

3. The computerized method of claim 1, further comprising obtaining attribute data relating to the one or more wireless data networks, the obtaining comprising obtaining data relating to a level of performance achievable via each of the one or more wireless data networks.

4. The computerized method of claim 1, wherein the evaluating comprises identifying the second one of the one or more wireless data networks as a network preferred for connecting relative to at least another of the one or more wireless data networks.

5. The computerized method of claim 1, wherein at least a portion of the plurality of respective data is related to a prescribed attribute, the prescribed attribute required for enabling the connection to the second one of the one or more wireless data networks.

6. The computerized method of claim 5, wherein the evaluating comprises evaluating, via only a prescribed subset of the plurality of computerized decision modules, the prescribed subset configured to evaluate the prescribed attribute.

7. The computerized method of claim 1, further comprising determining that the computerized client device has one or more required security credentials for the second one of the one or more wireless data networks, the attribute data comprised of at least data related to the determining.

8. The computerized method of claim 1, further comprising receiving, at the computerized client device, data representative of one or more policies from a prescribed server entity in data communication with the one or more wireless data networks, the one or more policies related to the enabling of the connection of the computerized client device to the second one of the one or more wireless data networks; and wherein the causing of the computerized client device to connect to the second one of the one or more wireless data networks is based at least on a plurality of instructions related to a prescribed network switching operation, the plurality of instructions received as a part of the data representative of the one or more policies.

9. The computerized method of claim 1, wherein:
the scan for the at least one additional wireless data network comprises receiving attribute data related to the second one of the one or more wireless data networks and at least one other wireless data network; and
the evaluating comprises based at least in part on the attribute data, determining whether the at least one other wireless data network is a better candidate for connection than the second one of the one or more wireless data networks, the determining of whether the at least one other wireless data network is the better candidate comprising:
(i) exchanging test data with the at least one other wireless data network; and
(ii) determining that a level of network performance achievable via connection with the at least one other wireless data network is higher than the second one of the one or more wireless data networks, the level of network performance relating to at least one of: throughput, quality-of-service (QoS), available bandwidth, network signal strength, or network signal-to-noise ratio (SNR).

10. Computer readable apparatus comprising a non-transitory storage medium, the non-transitory storage medium comprising at least one computer program having a plurality of instructions, the plurality of instructions configured to, when executed on a digital processing apparatus, cause a computerized client device to:
connect to a first wireless data network;
receive data representative of one or more baseline values associated with connecting the computerized mobile device to the one or more other wireless data networks;
receive attribute data related to one or more first candidate wireless data networks, the one or more first candidate wireless data networks comprising a subset of the one or more other wireless data networks;
evaluate at least the data representative of the one or more baseline values and attribute data;
based at least on the evaluation, attempt to connect the computerized mobile device to a second wireless data network, the second wireless data network being (i) one of the one or more candidate wireless data networks, and (ii) different than the first wireless data network;
receive second attribute data related to one or more second candidate wireless data networks, the one or more second candidate wireless data networks (i) comprising another subset of the one or more other wireless data networks, and (ii) different than the one or more first candidate wireless data networks; and
based at least in part on the received second attribute data, determine whether a level of network performance provided by any of the one or more other wireless data networks is higher than a level of performance of either the one or more first or second candidate wireless data networks.

11. The computer readable apparatus of claim 10, wherein the data representative of the one or more baseline values comprises data relating to one or more network conditions under which to sever an existing connection between the computerized mobile device and the first wireless data network.

12. The computer readable apparatus of claim 10, wherein the evaluation is performed via at least one or more software modules of the computerized mobile device, each of the one or more software modules configured to evaluate at least one of the one or more attribute data.

13. The computer readable apparatus of claim 12, wherein the one or more software modules are obtained from a prescribed server entity and downloaded to the computerized mobile device.

14. The computer readable apparatus of claim 12, wherein the one or more software modules are each configured to evaluate a prescribed attribute by utilizing a respective different evaluation process.

15. The computer readable apparatus of claim 10, wherein the plurality of instructions are further configured to, when executed on the digital processing apparatus, cause the computerized mobile device to:
evaluate one or more then-current capabilities of the computerized mobile device; and
based at least on the evaluation of the one or more then-current capabilities of the computerized mobile device, determine whether to effect the attempt of the connection to the second wireless data network.

16. A computerized client device configured to make at least one decision to cause the computerized mobile device to switch connection from a first wireless data network to a second wireless data network, the computerized client device comprising:
digital processor apparatus; and
storage apparatus in data communication with the digital processor apparatus, the storage apparatus comprising at least one computer program, the at least one computer program comprising a plurality of instructions which are configured to, when executed on the digital processor apparatus, cause the computerized client device to:
establish a data connection between the computerized client device and the first wireless data network;
obtain first data relating to at least one of: (i) the computerized client device, or (ii) at least the second wireless data network;
receive second data relating to a plurality of policies, the plurality of policies related to the switch from the first wireless data network to the second wireless data network, the plurality of policies comprising two or more policies with at least one incompatible provision;
resolve the at least one incompatible provision according to one or more prescribed rules stored on the computerized client device;
evaluate, via a plurality of computerized decision modules, at least the first data and the second data; and
based at least on the evaluation, cause the computerized client device to switch the data connection from the first wireless data network to the second wireless data network.

17. The computerized client device of claim 16, wherein the receipt of the second data comprises receipt of a monitoring code configured to (i) run on the computerized client device, and (ii) track data relating to connection history of the computerized client device.

18. The computerized client device of claim 17, wherein the monitoring code is further configured to identify, based at least on the tracked data, at least one of the one or more wireless data networks as being preferred for connection than other ones of the one or more wireless data networks.

19. The computerized client device of claim 16, wherein the causation of the computerized client device to switch the connection to the second wireless data network comprises maintenance of the connection to the first wireless data network concurrently for a least a portion of a time required to effect the switch.

20. A computerized method for making a decision for a computerized client device to switch connection from a first wireless data network to a second wireless data network, the computerized method comprising:

receiving data relating to a plurality of policies related to the making of the decision for the switch of the connection, the plurality of policies comprising two or more policies with at least one incompatible provision;

causing resolution of the at least one incompatible provision according to one or more prescribed rules;

monitoring, via a computerized logic configured to run on the computerized client device, interaction between the computerized client device and at least one of (i) the first wireless data network or (ii) the second wireless data network, for a prescribed period of time;

based at least on the monitoring, obtaining attribute data relating to at least the second wireless data network;

utilizing at least one of a plurality of computerized decision modules of the computerized client device to evaluate the obtained attribute data; and based at least on at least a portion of the received data relating to the plurality of policies and the evaluation, causing the computerized client device to effect the switch.

21. The computerized method of claim 20, wherein the receiving of the data relating to the one or more policies comprises receiving the data relating to the one or more policies based on at least one of a prescribed time interval or a prescribed operational trigger.

22. The computerized method of claim 20, wherein the monitoring of the interaction comprises tracking historical data related to data communication between the computerized client device and the at least one of (i) the first wireless data network or (ii) the second wireless data network.

23. The computerized method of claim 20, wherein the utilizing of the at least one computerized decision module to evaluate the obtained attribute data comprises utilizing the at least one computerized decision module to evaluate at least one attribute data designated as being required to be evaluated for the causing of the computerized client device to effect the switch.

* * * * *